United States Patent [19]

Raeckers

[11] Patent Number: 5,505,007
[45] Date of Patent: Apr. 9, 1996

[54] METHOD FOR DRYING STRUCTURAL COMPONENTS MADE OF FIBER REINFORCED PLASTIC MATERIALS

[75] Inventor: Bernd Raeckers, Bremen, Germany

[73] Assignee: Daimler-Benz Aerospace Airbus GmbH, Hamburg, Germany

[21] Appl. No.: 356,117

[22] Filed: Dec. 15, 1994

[30] Foreign Application Priority Data

Dec. 24, 1993 [DE] Germany .......................... 43 44 527.6

[51] Int. Cl.$^6$ ................................ F26B 5/06; F26B 5/04
[52] U.S. Cl. ............................................... 34/289; 34/412
[58] Field of Search .............................. 34/406, 412, 92, 34/403, 428, 66, 62, 287, 289

[56] References Cited

U.S. PATENT DOCUMENTS

| | | | |
|---|---|---|---|
| 3,615,310 | 10/1971 | Long | 34/92 X |
| 3,811,199 | 5/1974 | Bouldoires | 34/92 |
| 3,812,224 | 5/1974 | Smith et al. | 264/28 |
| 4,090,312 | 5/1978 | Fraser | 34/92 |
| 4,142,303 | 3/1979 | Fraser | 34/92 |
| 4,402,940 | 9/1983 | Nose et al. | 424/101 |
| 4,624,868 | 11/1986 | Muller | 427/384 |
| 4,953,299 | 9/1990 | Gimeno et al. | 34/92 |
| 5,377,429 | 1/1995 | Sandhu et al. | 34/92 X |

FOREIGN PATENT DOCUMENTS 0064386  3/1990  Japan .......................................... 34/92

*Primary Examiner*—Hoang Nguyen
*Attorney, Agent, or Firm*—W. G. Fasse; W. F. Fasse

[57] ABSTRACT

Fiber reinforced structural components, such as panels with honeycomb cores sandwiched between at least two outer skin layers are dried to remove moisture that may have entered into the interior of the structure. For this purpose the component is cooled in a cooling environment below the freezing point to about −5° to −20° C. and then exposed to a reduced pressure of less than 0.5 mbar. Under these drying conditions moisture is driven out of the component by sublimation so that the moisture does not pass through the liquid phase. The drying time may be reduced by a temperature increase to 80°–100° C. while maintaining the low pressure. The freezing increases the capillary action for the moisture removal. However, for an increased efficiency in the moisture removal small diameter holes, e.g. 0.1 mm bores, may be drilled into the component to facilitate the moisture escape. After drying is complete the holes are closed again e.g. by laminating further cover sheets to the component. Drying time may be reduced by a temperature increase to 80°–100° C. while maintaining the low pressure.

8 Claims, No Drawings

METHOD FOR DRYING STRUCTURAL COMPONENTS MADE OF FIBER REINFORCED PLASTIC MATERIALS

FIELD OF THE INVENTION

The invention relates to a method for drying fiber reinforced plastic material components such as panels having a sandwich construction with a core between outer skin layers.

BACKGROUND INFORMATION

Structural components made of fiber reinforced plastic materials, for instance sandwich structures such as panels, may take up moisture which needs to be removed again. Moisture take-up is especially a problem in sandwich structures in which a honeycomb core structure with honeycomb cells is covered on both sides by skin layers made of fiber reinforced laminates. These skin layer laminates are made of a matrix material having embedded therein glass fibers, carbon fibers, or aramid fibers and these laminates close the core cells in which moisture may accumulate over time due to capillary ducts in the skin layers through which water may enter into the hollow cells.

The capillary ducts can be formed by micro-cracks that may be naturally present in the fiber reinforced panels or these cracks may be formed during service of these panels. For cost reasons, it is not desirable to replace entire panels that have taken up moisture and repair is preferable, for example, by applying one or several further skin layers to repair the leaks, whereby the additional skin layers would also be made of fiber reinforced plastic materials. However, before such repair can be made, it is absolutely necessary to first remove the moisture or water from the inner volume of the structural component. If the water or moisture is not removed, delamination of the panel structure is unavoidable because the temperatures at which the additional skin layers must be cured are in the range of about 120° C.–180° C. and the water would start boiling at these temperatures so that delaminations between the honeycomb cell core and the skin layers is unavoidable.

It is known to dry fiber reinforced structural components in conventional drying ovens in which heat is supplied and which drying may even take place at reduced pressures in order to remove water that is molecularly bound in the matrix of the fiber reinforced material. However, the just mentioned known method is not suitable for removing water that has entered through the above mentioned capillary ducts into the sandwich structure, especially if that water has accumulated in the honeycomb cells.

The drying at elevated temperatures has the further drawback, that the drying temperatures and/or the lowering of the reduced pressure has its limitations because it must be avoided that the water comes to a boil inside the laminated structure, thereby destroying the structural component primarily by delamination.

OBJECTS OF THE INVENTION

In view of the above it is the aim of the invention to achieve the following objects singly or in combination:

to remove moisture and liquid water from structural components of the type described above, thereby avoiding any damage to the structural component;

to dry structural components by sublimation while simultaneously assuring a satisfactory moisture and water removal; and to avoid a boiling of moisture and water inside a fiber reinforced structural component.

SUMMARY OF THE INVENTION

According to the invention the above objects have been achieved in that the structural component to be dried is subjected first to cooling temperatures, preferably in the range of $-5°$—$20°$ C. until all water and moisture is frozen, and then to a reduced pressure, preferably smaller than 0.5 mbar. In the preferred embodiment the structural component is first cooled down and when the entrapped water is frozen, the pressure is reduced, preferably to a reduced pressure smaller than 0.5 mbar (50 Pa), while the freezing temperature is maintained. After having achieved the reduced pressure, the temperatures can be raised to $80°$–$100°$ C. in order to allow quicker dry-out.

By employing a freeze drying for the drying of fiber reinforced structural components the invention has solved a longstanding problem with the added advantage that especially sandwich structures with honeycomb core cells can be sufficiently dried for a following repair by the application of additional skin layers. Even components which have already been substantially damaged by the entry of moisture and water can advantageously be recovered by the laminating of additional skin layers to provide repaired structural panels that are fully usable again, thereby avoiding an expensive exchange of these components.

DETAILED DESCRIPTION OF A PREFERRED EXAMPLE EMBODIMENT AND OF THE BEST MODE OF THE INVENTION

First, the structural components are cooled down to a temperature of about $-5°$—$20°$ C., whereby the cooling duration is determined by a time required to cause all moisture and liquid inside the structural component to convert into ice. The duration thus is determined by the thickness of the structural component and by the heat conductivity of the material of which the fiber reinforced structural component is made.

Second, the cooled structural component is introduced into a vacuum container in which the reduced pressure is smaller than 0.5 mbar (50 Pa). The above temperature is maintained in the vacuum container. Under these conditions the structural component is dried by sublimation of the ice, whereby the ice is converted directly from the solid state into the gaseous state without passing through the liquid phase. In order to decrease the drying time, the temperature can be increased to $80°$–$100°$ C. maintaining the pressure.

The gaseous phase is removed from the honeycomb core through a conventional condenser equipped with a suction fan. Once the structural component is dried, it can be repaired by laminating further cover sheets to the sides of the component.

The present method positively avoids that any water inside the core begins boiling due to the pressure reduction because at that point the water is frozen. It has been found that the cooling causes a shrinking of the material of which the structural component is made. The shrinking actually increases the size of the capillary ducts formed by micro-cracks in the material that caused the take-up of moisture and water is the first place. The capillary ducts of increased size formed by micro-cracks actually facilitate the removal of the ice by sublimation.

If the capillary ducts formed by micro-cracks, in spite of the shrinking of the structural component under the freezing temperature that made these ducts formed by micro-cracks more effective for the moisture removal, should be inadequate for the complete moisture removal, small diameter venting bores or voids may be introduced into the outer skin layers of the panel or component by, for example drilling. Such venting holes or bores would preferably have a diameter of about 0.1 mm. These small holes and any capillary ducts and micro-cracks are then closed again by additional outer skin layers laminated to the structural component or panel after the moisture removal has been complete.

Although the invention has been described with reference to specific example embodiments, it will be appreciated that it is intended to cover all modifications and equivalents within the scope of the appended claims.

What is claimed is:

1. A method for drying a moisture containing structural component made of fiber reinforced plastic material having micro-crack forming capillary ducts therein, comprising the following steps:

(a) cooling the structural component to a temperature below freezing for increasing the size of said micro-crack forming capillary ducts and to form ice, (b) exposing said structural component to a reduced pressure below atmospheric pressure sufficient to cause sublimation of said ice, and (c) increasing the temperature to 80°–100° C. while maintaining said reduced pressure.

2. The method of claim 1, wherein said below freezing temperature is about −5° to −20° C.

3. The method of claim 1, wherein said below atmospheric reduced pressure is smaller than about 0.5 mbar (50 Pa).

4. The method of claim 1, further comprising forming venting holes into said structural component, said venting holes having a diameter of about 0.1 mm.

5. The method of claim 1, wherein said structural component is formed with at least one skin layer having voids in said skin layer.

6. The method of claim 1, wherein said structural component is formed as a panel having a honeycomb core sandwiched between at least two outer skin layers.

7. The method of claim 6, further comprising laminating additional skin layers to said structural component after sufficient moisture has been removed from said structural component to seal said structural component.

8. The method of claim 7, further comprising forming venting holes into said structural component prior to laminating said additional skin layers to said structural component.

* * * * *